(12) United States Patent
Wagner et al.

(10) Patent No.: US 10,780,617 B2
(45) Date of Patent: Sep. 22, 2020

(54) ADAPTOR PLATE AND INJECTION MOLDING MACHINE HAVING SUCH AN ADAPTOR PLATE

(71) Applicant: MHT Mold & Hotrunner Technology AG, Hochheim (DE)

(72) Inventors: Christian Wagner, Mainz (DE); Stefan Schweininger, Wiesbaden (DE); Silvester Koziollek, Hochheim am Main (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 169 days.

(21) Appl. No.: 15/670,418

(22) Filed: Aug. 7, 2017

(65) Prior Publication Data

US 2018/0043592 A1    Feb. 15, 2018

(30) Foreign Application Priority Data

Aug. 9, 2016   (DE) ......................... 10 2016 114 706

(51) Int. Cl.
    *B29C 45/27*   (2006.01)
    *B29C 45/23*   (2006.01)
    *B29C 45/28*   (2006.01)

(52) U.S. Cl.
    CPC ........ *B29C 45/2703* (2013.01); *B29C 45/231* (2013.01); *B29C 45/281* (2013.01);
    (Continued)

(58) Field of Classification Search
    CPC .............................. B29F 1/05; B29C 45/2703
    See application file for complete search history.

(56) References Cited

U.S. PATENT DOCUMENTS 3,849,048 A * 11/1974 Bielfeldt ............. B29C 45/2806
                                                       425/567
4,173,448 A * 11/1979 Rees ..................... B29C 45/281
                                                         251/62

(Continued)

FOREIGN PATENT DOCUMENTS

DE  10 2011 002 586 A1   7/2012
EP       1 142 686 A1   10/2001

OTHER PUBLICATIONS

European Search Report of co-pending Application EP 17 184 332.9 dated Dec. 21, 2017.

(Continued)

*Primary Examiner* — Matthew J Daniels
*Assistant Examiner* — Wayne K. Swier
(74) *Attorney, Agent, or Firm* — Morgan, Lewis & Bockius LLP

(57) ABSTRACT

The present invention concerns an adaptor plate for connecting a cover plate to a plurality of piston housings of an injection molding machine, wherein the adaptor plate has a first fluid passage and a second fluid passage for feeding a first and a second control fluid into the piston housings, wherein the first fluid passage has at least one first fluid passage inlet for receiving the first control fluid and a plurality of first fluid passage outlets for discharge of the first control fluid to the piston housings and the second fluid passage has at least one second fluid passage inlet for receiving the second control fluid and a plurality of second fluid passage outlets for discharge of the second control fluid to the piston housings.

16 Claims, 6 Drawing Sheets

Figure 1:
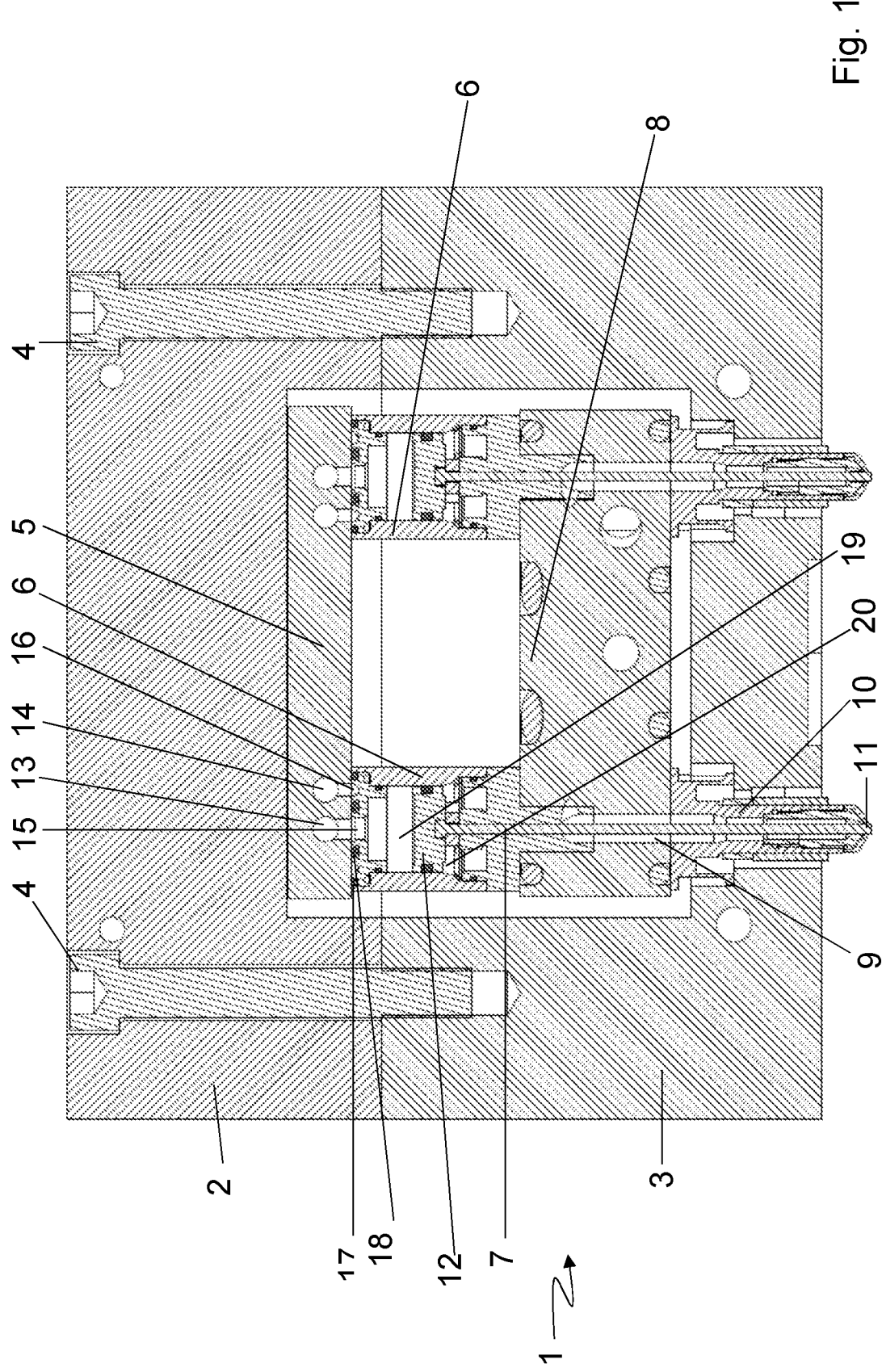

(52) U.S. Cl.
CPC ............... *B29C 2045/2719* (2013.01); *B29C 2045/2817* (2013.01)

(56) References Cited

U.S. PATENT DOCUMENTS

| | | | | |
|---|---|---|---|---|
| 4,468,191 | A | * | 8/1984 | Gellert .................. B29C 45/281 425/564 |
| 4,698,013 | A | * | 10/1987 | Butcher ................ B29C 45/281 425/549 |
| 4,747,770 | A | * | 5/1988 | Schmidt ................ B29C 45/281 264/328.15 |
| 4,761,343 | A | * | 8/1988 | Gellert ................ B29C 45/2727 264/328.14 |
| 2009/0057593 | A1 | * | 3/2009 | Gaillard ................ B29C 45/281 251/324 |
| 2012/0156324 | A1 | | 6/2012 | Belzile et al. |
| 2012/0156325 | A1 | | 6/2012 | Ten et al. |
| 2013/0095202 | A1 | * | 4/2013 | Spuller ................ B29C 45/281 425/549 |
| 2013/0230617 | A1 | * | 9/2013 | Klobucar ................ B29C 45/20 425/549 |
| 2013/0287883 | A1 | | 10/2013 | Schweininger et al. |
| 2015/0158223 | A1 | * | 6/2015 | Fairy .................. B29C 45/2737 425/549 |

OTHER PUBLICATIONS

German Search Report of Application 10 2016 114 706.0 dated Mar. 1, 2017.
Office Action dated Sep. 18, 2018, for co-pending European Patent Application No. EP 17 184 332.9.

* cited by examiner

ADAPTOR PLATE AND INJECTION MOLDING MACHINE HAVING SUCH AN ADAPTOR PLATE

The present invention concerns an injection molding machine having a hot runner for feeding a plasticized molten material into a plurality of molds, a plurality of closure needles for selectively closing or opening the hot runner, wherein each closure needle has a piston which is connected thereto and which is arranged in a housing having an opening and which subdivides the housing into a first and a second chamber, and a cover plate, wherein the housing has a first fluid inlet in communication with the first chamber and a second fluid inlet in communication with the second chamber. The first and second fluid inlets are so arranged that fluid can be transferred into the housing so that the piston can be acted upon with fluid on both sides.

Therefore, the closure needle connected to the piston can be reciprocated by the piston being subjected to the action of the fluid so that the hot runner can be opened in specifically targeted fashion by means of the fluid in order to transfer plasticized molten material into the respective mold.

The cover plate closes the opening of the housing. Such an injection molding machine is described for example in U.S. Pat. No. 4,173,448.

In the embodiment illustrated there the cover plate has recesses into which the housing projects so that the housing is arranged in part within the recess.

As the generally heated plasticized molten material is supplied through the hot runner and a hot runner block in which the hot runner is disposed is of a considerable extent by virtue of the large number of closure needles arranged therein and each connected to a respective piston the exact position of the closure needle relative to the cover plate changes when the injection molding machine is brought into operation, by virtue of the thermal expansion of the housing and hot runner block, that is linked to the increase in temperature.

That has the result on the one hand that, upon heating of the hot runner block and the housing connected thereto, the housing expands in the direction of the cover plate. In addition however there is also a displacement of the housing perpendicularly to the needle axis so that, in terms of the dimensioning of the fluid outlet opening of the cover plate and the fluid inlet opening of the housing, care is to be taken to ensure that they are aligned with each other as much as possible both in the cold condition and also at operating temperature in order to ensure transfer of the fluid from the cover plate into the housing at all temperatures.

In the above-mentioned U.S. Pat. No. 4,173,448 provided in the housing wall are a plurality of passages connecting the second fluid inlet of the housing to the second chamber. The fluid inlet of the housing is formed by an annular groove, in the bottom of which the passages end. In order to ensure that the fluid outlet of the cover plate and the fluid inlet of the housing are at least partially aligned with each other over a wide temperature range so that transfer of the fluid is ensured therefore the housing wall must be of relevant thickness in order to be able to provide correspondingly large passage bores. Nonetheless, if the housing and the cover plate are not perfectly aligned with each other, it can happen upon a change in temperature that satisfactory transfer of fluid between the cover plate and the housing is no longer possible, and this can result in a reduced or indeed totally absent control option for the closure valve.

Therefore, DE 10 2011 002 586 A1 has already proposed an adaptor element having a fluid inlet opening and a fluid outlet opening, which is of such a design configuration that the fluid provided by the cover plate by way of the second fluid outlet opening can be supplied by way of the fluid inlet opening into the adaptor element and by way of the fluid outlet opening from the adaptor element into the second fluid inlet of the housing.

That structure however is relatively complicated and expensive as a separate adaptor element must be made available for each piston housing.

Taking the described state of the art as the basic starting point therefore the object of the present invention is to provide an injection molding machine of the kind set forth in the opening part of this specification, which solves or at least reduces the described problems and is of a simpler structure.

According to the invention that is achieved by an adaptor plate which is provided for connecting a cover plate to a plurality of piston housings of an injection molding machine, wherein the adaptor plate has a first fluid passage for feeding a first control fluid into the piston housings and a second fluid passage for feeding a second control fluid into the piston housings, wherein the first fluid passage has at least one first fluid passage inlet for receiving the first control fluid and a plurality of first fluid passage outlets for discharge of the first control fluid to the piston housings and the second fluid passage has at least one second fluid passage inlet for receiving the second control fluid and a plurality of second fluid passage outlets for discharge of the second control fluid to the piston housings. For example compressed air can be used as the first and second control fluid. Alternatively it is also possible to use other gases or liquids like for example hydraulic oil.

According to the invention therefore there is provided an adaptor plate for adapting a plurality of piston housings to the cover plate. Apart from the fact that the adaptor plate according to the invention now replaces a plurality of adaptor elements in the state of the art and is therefore of a simpler structure the adaptor plate according to the invention also has a common first and second fluid passage serving to supply the plurality of piston housings with control fluid. The cover plate therefore no longer has to have corresponding fluid inlets and outlets respectively for each piston housing. Instead thereof those inlets and outlets are arranged in the adaptor plate and they can be supplied from a first and a second fluid passage. The feed of control fluid into the adaptor plate can either be effected by way of corresponding fluid outlets in the cover plate or independently of the cover plate that can be provided for example by means of control fluid hoses. Particularly in the latter case the cover plate can be markedly less expensive to produce as the provision of extremely long slots for constituting corresponding control fluid passages can be eliminated.

Advantageously the cross-section of the first fluid passage inlet differs from the cross-sections of the first fluid passage outlets, wherein preferably the cross-section of the second fluid passage inlet also differs from the cross-sections of the second fluid passage outlets. That ensures that a sufficiently large amount of fluid can be introduced into the fluid passages by way of the fluid passage inlets of the adaptor plate so that all fluid passage outlets can be supplied with control fluid.

In a further particularly preferred embodiment the adaptor plate comprises at least two plate-shaped elements which are arranged in mutually superposed relationship, that is to say in the manner of a sandwich arrangement, and comprise different materials. In that case the material from which the one plate-shaped element is made has a lower level of thermal conductivity than the material from which the other plate-shaped element is made. Particularly preferably the fluid passage outlets are arranged in the plate-shaped element made from the material of higher thermal conductivity. The plate-shaped element having the lower level of thermal conductivity is therefore intended for the arrangement on the cover plate.

It has been found that, by virtue of that configuration, the flow of heat from the hot runner in the direction of the cover plate can be markedly reduced, which leads to a not inconsiderable energy saving as less heat has to be put into the hot runner to keep the molten material plasticized.

A further preferred embodiment provides that the adaptor plate comprises at least two adaptor plate segments, wherein each of the at least two adaptor plate segments has at least one fluid passage outlet and at least one fluid passage extends over the at least two adaptor plate segments. The multi-part configuration means that the adaptor plate can be more easily produced and also more easily fitted in injection molding machines.

In a further preferred embodiment it is provided that the adaptor plate has a through opening for receiving a sprue tube of an injection molding machine.

In a further preferred embodiment there is provided a third fluid passage for supplying a temperature-control fluid. Water for example can be used as the temperature-control fluid. Before the water is introduced into the fluid passage it can be subjected to temperature control in order to cool down or heat up the adaptor plate.

According to the invention it is possible in particular to provide a module system which comprises an adaptor plate according to the invention, a plurality of piston housings in which a respective piston connected to a closure needle is arranged, a hot runner distributor plate in which a hot runner is arranged, and a plurality of nozzle housings which are so arranged that by a movement of one of the pistons the closure needle connected to said piston selectively opens or closes an opening in the nozzle housing.

In a preferred embodiment in a module system the number of first fluid outlets corresponds to the number of piston housings and the number of nozzle housings.

Such module systems can be produced and stocked by the injection molding machine manufacturer. As soon as the desired number of hot runner outlets of an injection molding machine is established the cover plate and the hot runner plate are then produced and thereafter the desired number of module systems is fitted and screwed to the hot runner plate.

For example the module system can comprise an adaptor plate with 16 first and 16 second fluid passage outlets, 16 piston housings, a hot runner distributor plate and 16 nozzle housings. Then six module systems are fitted between the cover plate and the hot runner plate to produce an injection molding machine having 96 hot runner outlets.

Twelve module systems are required to make an injection molding machine having 192 hot runner outlets.

That measure means that the delivery time of such injection molding machines can be markedly reduced as the module systems can be stockpiled and used for a plurality of injection molding machines of the most widely differing specifications.

Providing an adaptor plate according to the invention having a plurality of piston housings in the form of a module system, wherein the number of first fluid passage outlets corresponds to the number of piston housings. The corresponding module system can be used to easily fit the piston housings including the adaptor plate in the injection molding machine.

Advantageously the module system already has a sprue tube and particularly preferably also a hot runner distributor plate, the sprue tube extending through the adaptor plate. In this embodiment the complicated and expensive operation of positioning the piston housings or the adaptor plate respectively relative to the sprue tube is eliminated.

The invention also concerns an injection molding machine having the described adaptor plate, which is so designed that fluid can be transferred by way of the first fluid outlet of the adaptor plate into the first fluid inlet of the piston housing and fluid can be transferred by way of the second fluid outlet of the cover plate into the second fluid inlet of the piston housing so that the piston can be acted upon with fluid on both sides.

In a particularly preferred embodiment the cover plate has a first and a second fluid outlet, wherein the first fluid outlet of the cover plate is connected to the first fluid inlet of the adaptor plate and the second fluid outlet of the cover plate is connected to the second fluid outlet of the adaptor plate.

Accordingly the adaptor plate is supplied with the control fluids by way of the cover plate.

A further preferred embodiment provides that the hot runner is arranged in a hot runner distributor plate and the adaptor plate is fixed to the hot runner distributor plate. A further preferred embodiment provides that the adaptor plate is connected in positively locking relationship to the cover plate in all directions perpendicularly to the closure needle axis but a relative movement is possible in the direction of the closure needle axes. For example adaptor plate and cover plate can be pinned together, that is to say the adaptor plate or the cover plate has a pin and the corresponding other element has a corresponding hole into which the pin engages.

In a further preferred embodiment it is provided that each closure needle is guided by one of the piston housings through the hot runner distributor plate into a nozzle housing which has an opening closable by the closure needle, a spring element being arranged between the nozzle housing and the cover plate. That measure ensures that the adaptor plate is pressed against the piston housing with sufficient force to seal off the corresponding fluid passages relative to each other. In principle the spring element can be disposed between the cover plate and the adaptor plate, between the piston housing and the hot runner distributor plate or between the hot runner distributor plate and the nozzle housing.

A further particularly preferred embodiment provides that the piston housing and/or the adaptor plate has or have a first circular groove in which a first O-ring is arranged, wherein the first O-ring seals off the first fluid inlet of the piston housing with respect to the second fluid inlet of the piston housing.

In addition the piston housing and/or the adaptor plate can have a second circular groove in which a second O-ring is arranged, wherein the first fluid inlet of the piston housing is arranged between the first and second O-rings.

Figure 2:
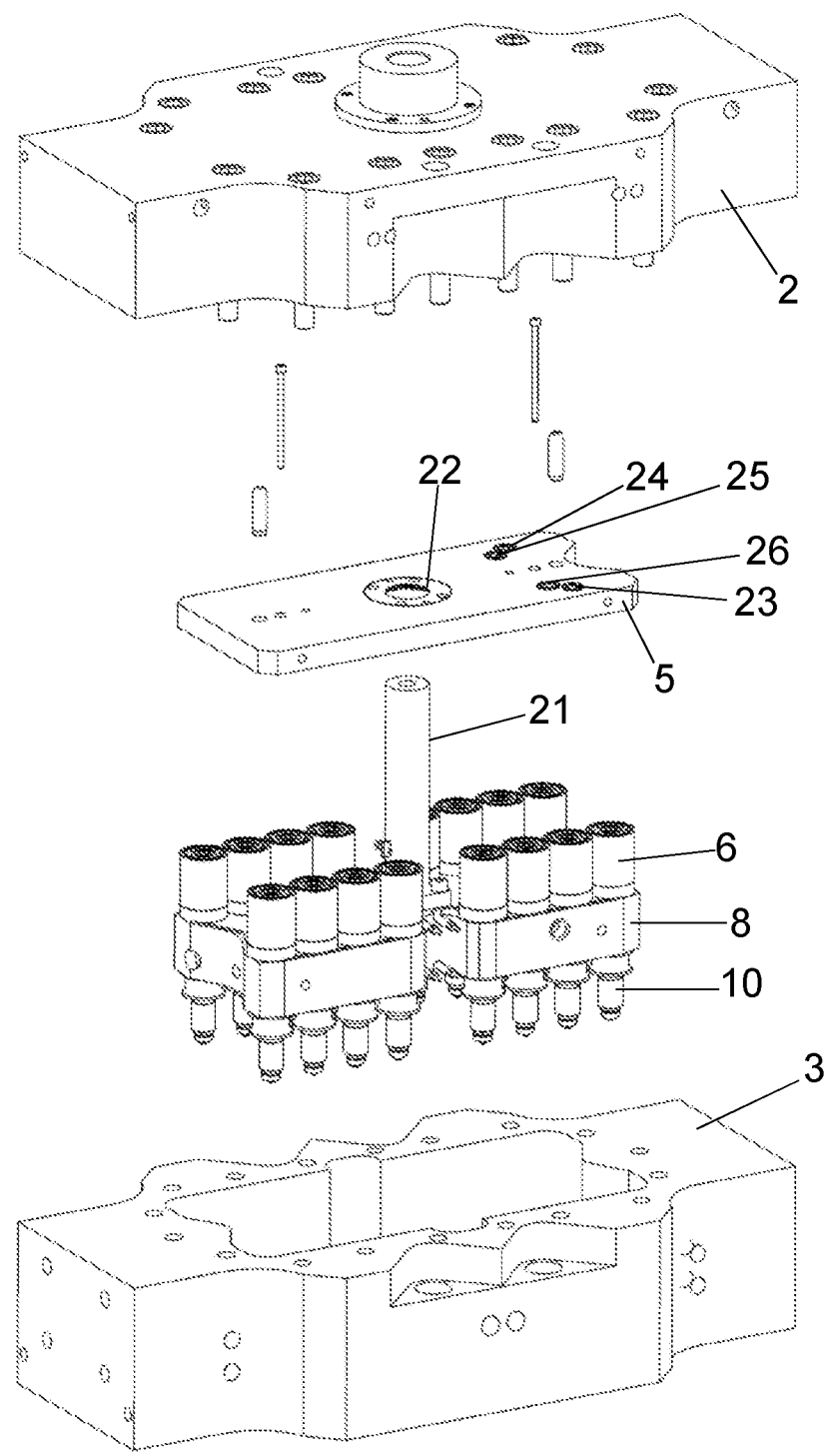
Figure 3:
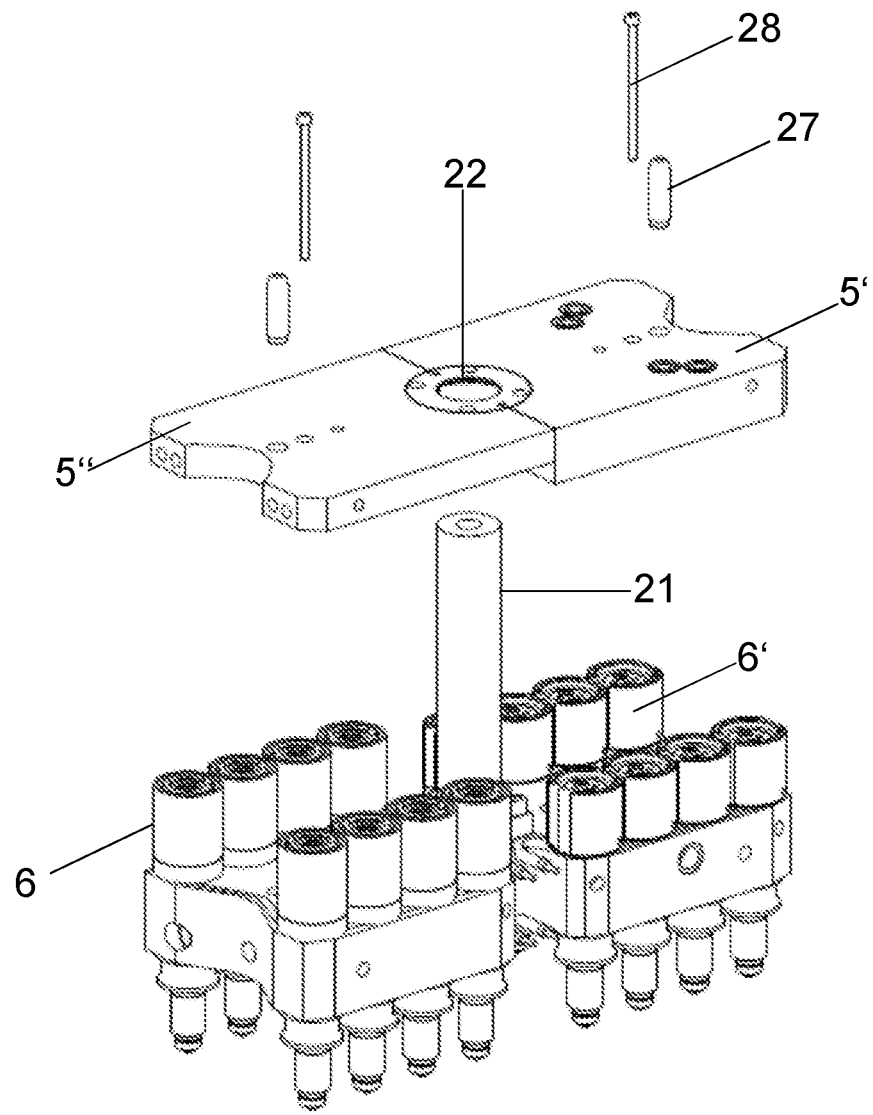
Figure 4:
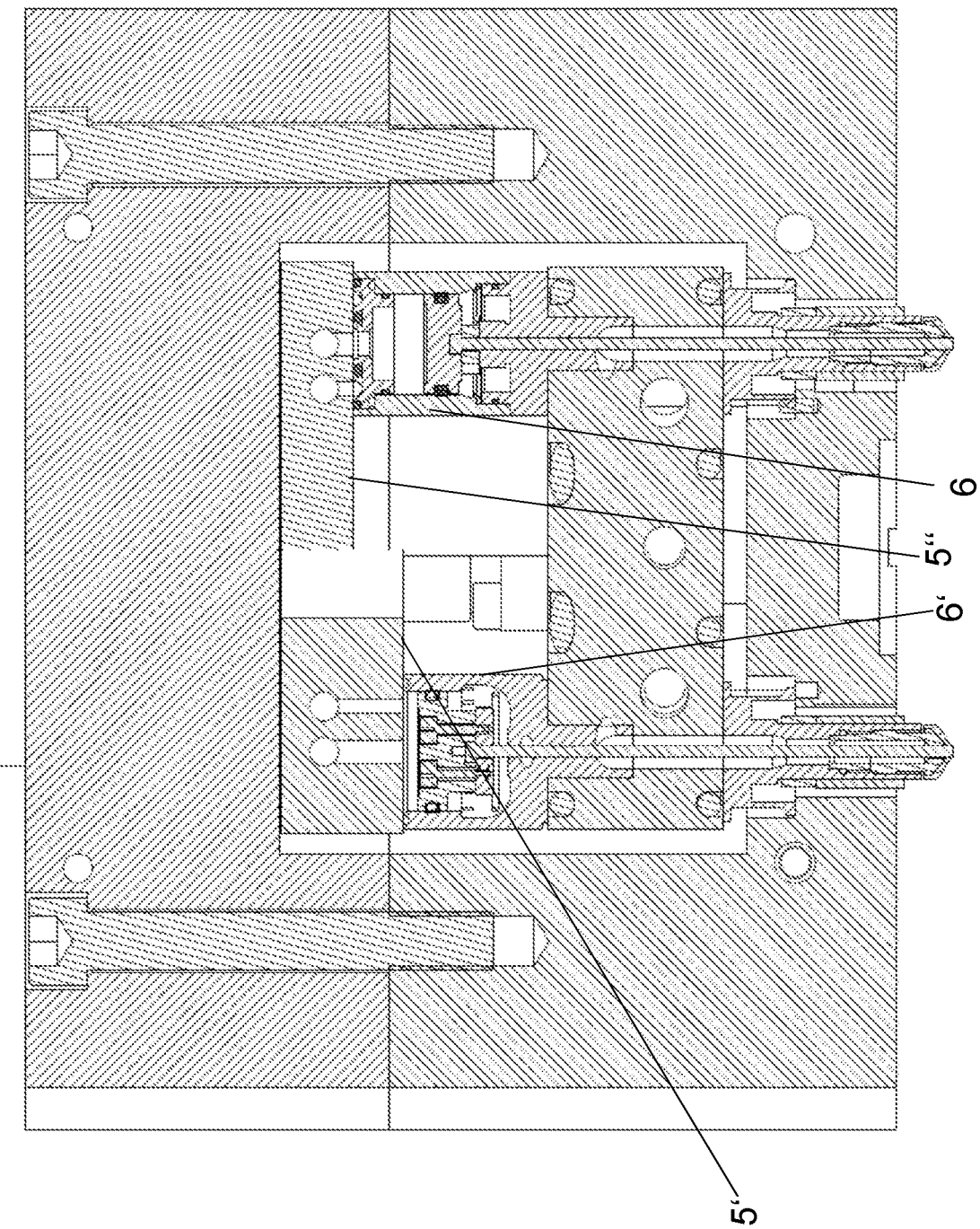
Figure 5:
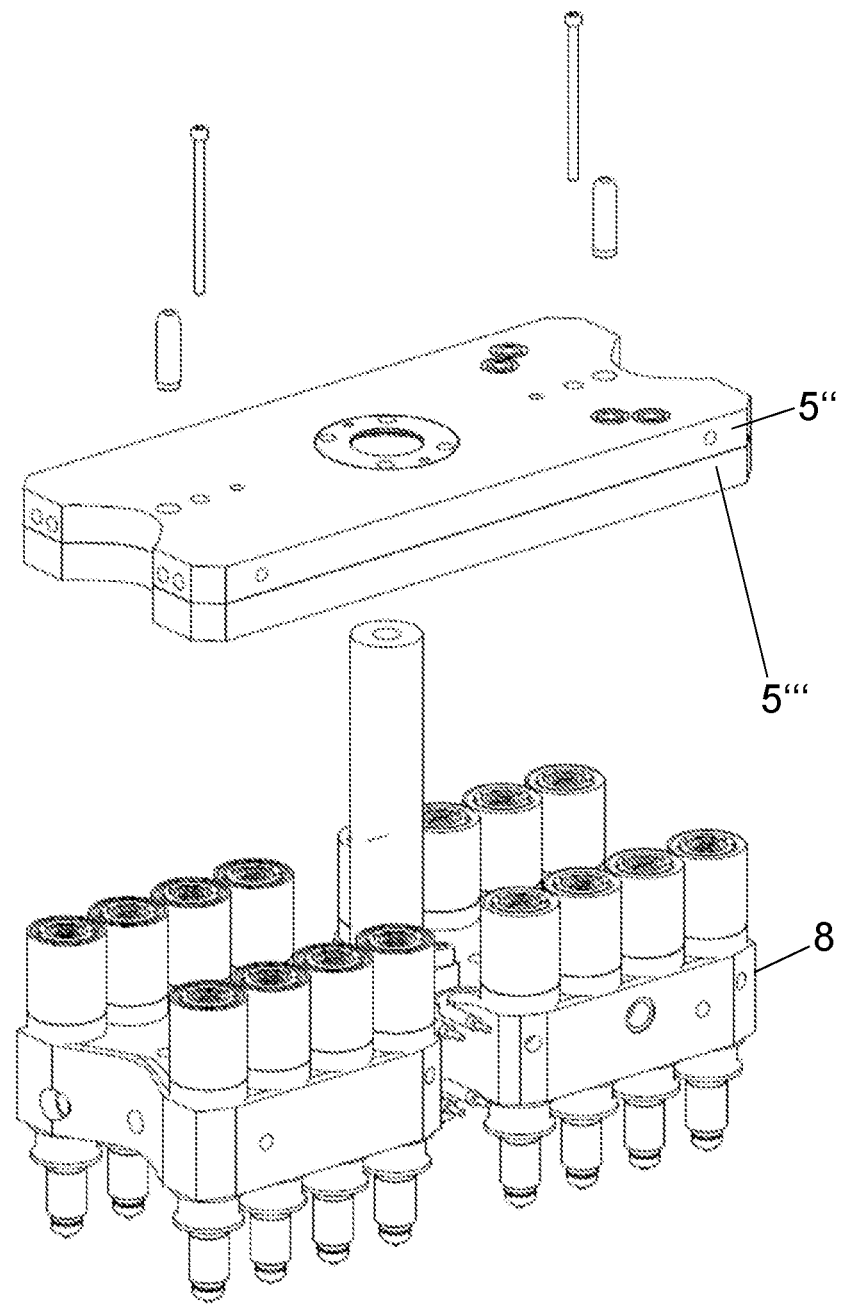
Figure 6:
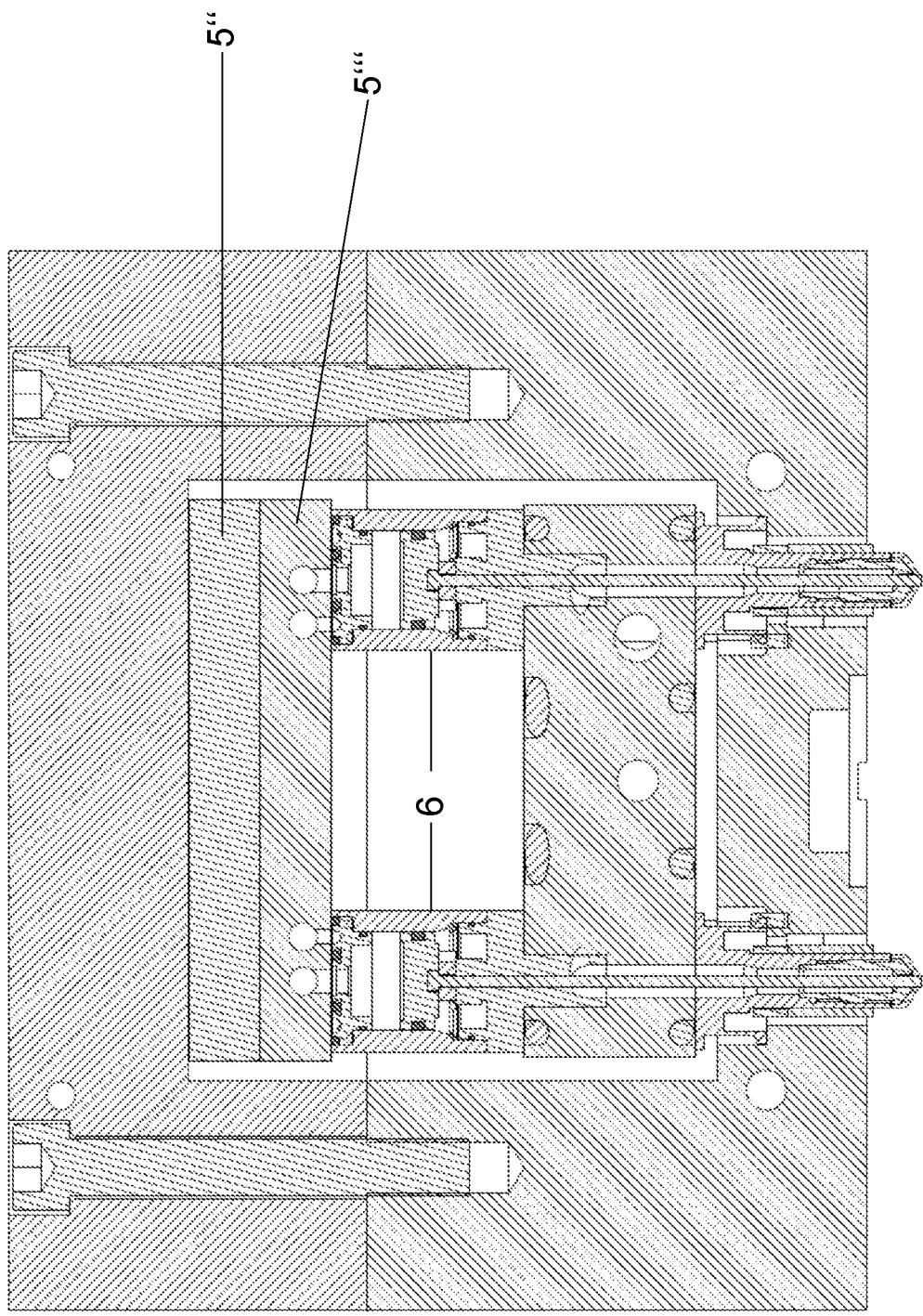

Further advantages, features and possible uses of the present invention will be clearly apparent from the description hereinafter of some embodiments and the accompanying Figures in which:

FIG. 1 shows a cross-sectional view of a first embodiment according to the invention of the injection molding machine, FIG. 2 shows a perspective exploded view of the injection molding machine of FIG. 1, FIG. 3 shows a perspective view of a module system of a second embodiment of the invention, FIG. 4 shows a cross-sectional of the module of FIG. 3, FIG. 5 shows a perspective exploded view of a third embodiment of the invention, and FIG. 6 shows a sectional view of the embodiment of FIG. 5.

FIG. 1 shows an injection molding machine according to the invention. That machine has a hot runner plate 3 and a cover plate 2 resting thereon, the plates being screwed together by means of the screws 4. The cover plate 2 and the hot runner plate 3 form a cavity in which an adaptor plate 5, a plurality of piston housings 6, a hot runner distributor plate 8 and a plurality of nozzle housings 10 are arranged. The nozzle housings 10 extend through openings in the hot runner plate 3.

The illustrated injection molding machine 1 can be used to produce corresponding moldings like for example PET preforms. The corresponding mold cavities are disposed for that purpose beneath the nozzle housings 10.

Arranged in the piston housing 6 is a piston 12 which can reciprocate within the housing and subdivides the housing into two chambers 19 and 20. Connected to the piston 12 is a closure needle 7 which extends from the piston housing through the hot runner distributor plate 8 by way of the nozzle housing 10 as far as the opening 11 in the nozzle housing 10. Arranged in the hot runner distributor plate 8 is a part of the hot runner 9 which in operation is filled with heated plasticized molten material. If now the piston 12 is moved upwardly the closure needle 7 also moves upwardly and opens the opening 11 in the nozzle housing 10 so that molten material can be discharged from the opening 11 into provided mold cavities.

In order to move the piston 12 the chambers 19 and 20 are acted upon selectively with a control fluid, for example air. For that purpose the piston housing 6 has a first fluid inlet 15 connected to the upper chamber 19 and a second fluid inlet 16 connected to the lower chamber 20. The feed of control fluid into the piston housings 6 is effected by way of the adaptor plate 5 which extends over a plurality of piston housings 6. The adaptor plate 5 has a first fluid outlet 13 and a second fluid outlet 14 which are in communication with the fluid inlets of the piston housing 6. O-rings 18 and 17 which are introduced into corresponding circular grooves are provided for sealing off the fluid passages relative to each other and relative to the exterior.

FIG. 2 shows an exploded view of the injection molding machine of FIG. 1. It will be seen here that the hot runner distributor plate 8 has in total 16 nozzle housings 10 and correspondingly 16 piston housings 6 which are grouped around the sprue tube 21. Plasticized molten material can be transferred into the hot runner distributor plate 8 by way of the sprue tube 21. As an alternative thereto the plasticized molten material could be supplied laterally so that it is possible to dispense with the vertical sprue tube.

The adaptor plate 5 has a through opening 22 through which the sprue tube 21 is passed. The illustrated adaptor plate 5 in the illustrated example therefore closes all 16 piston housings 6. In this example the adaptor plate has two first fluid passages 23, 24 connected to the first fluid outlet 13 and two second fluid passages 25, 26 connected to the second fluid outlet 14. The fluid passages 23, 26 supply control fluid to the eight piston housings arranged at the front in FIG. 2 while the fluid passages 24, 25 supply control fluid to the piston housings shown at the back.

The adaptor plate 5 is screwed to the hot runner distributor plate 8 by means of the screws 28. The pins 27 which engage into corresponding bores both in the cover plate 2 and also in the adaptor plate 5 provide for sealing integrity of the adaptor plate relative to the cover plate in the plane of the adaptor plate 5, in which respect however relative movement as between the adaptor plate 5 and the cover plate 2 is possible to a limited extent by virtue of the pin connection by means of the pins 27.

The adaptor plate 5 together with the hot runner distributor plate 8, the piston housings 6, the nozzle housings 10 and the sprue tube 21 forms a module system which can be provided when already pre-assembled. When equipping the hot runner plate 3 with the corresponding nozzles it is then possible to access the module.

FIG. 3 shows an exploded view of such a module in a second embodiment.

Insofar as possible identical references have been used for identical components. In the second embodiment the adaptor plate 5 is made from two segments 5' and 5". The two segments 5' and 5" are of differing thickness. In principle however the segments can also be of the same thickness. The use of segments of differing thicknesses permits the use of piston housings 6 and 6' which are built up to differing heights. It will be seen from FIG. 3 that, besides the piston housings 6 known from FIG. 2, flatter piston housings 6' have also been used in part here. In order nonetheless to securely mount those piston housings between the cover plate 2 and the hot runner plate 3 the adaptor plate 5 must compensate for the difference in height so that the adaptor plate has the segment 5'.

That will be clear from the corresponding sectional view in FIG. 4. It will be clearly seen here that piston housings 6' of smaller height and piston housings 6 of greater height have been used. Both configurations of the piston housings 6, 6' can be used within an injection molding machine, by virtue of the segmented configuration of the adaptor plate 5 with the segments 5' and 5" of differing thickness.

FIGS. 5 and 6 show a third embodiment of the invention in which the adaptor plate 5 comprises two portions 5''' and 5'''' which rest upon each other in a sandwich-like structure. Here the element 5'''' is made from a different material from the element 5''', more specifically a material of lower thermal conductivity in order to ensure heat insulation between the temperature-controlled hot runner distributor 8 and the generally cooled cover plate 2. Separate cooling of the cover plate 2 can be eliminated under some circumstances by the provision of a suitably divided cover plate with heat insulation. At any event however a lower through-flow of coolant is necessary as less heat energy is transmitted by way of the piston housings.

LIST OF REFERENCES 2 cover plate
3 hot runner plate
4 screws
5 adaptor plate
5', 5" segments
5''', 5'''' parts of the adaptor plate
6, 6' piston housing
7 closure needle
8 hot runner distributor plate
9 hot runner
10 nozzle housing
11 opening
12 piston
13 first fluid outlet
14 second fluid outlet
15 first fluid inlet
16 second fluid inlet
17, 18 O-ring 19, 20 chamber
21 sprue tube
22 through opening
23, 24 first fluid passage
25, 26 second fluid passage
27 pins
28 screws

The invention claimed is:

1. An injection molding machine comprising:
a cover plate;
a hot runner plate having a plurality of openings for receiving nozzle housings; and
a plurality of module systems, each module system consisting of:
an adaptor plate,
a plurality of piston housings, wherein, in each piston housing, a piston is connected to a closure needle,
a hot runner distributor plate having a hot runner arranged therein, and
a plurality of nozzle housings,
wherein the plurality of nozzle housings are arranged so that by a movement of one of the pistons the closure needle connected to said piston selectively opens or closes an opening in the nozzle housing,
wherein the adaptor plate connects the cover plate to the plurality of piston housings,
wherein the adaptor plate has a first fluid channel for supplying a first control fluid into the piston housings and a second fluid channel for supplying a second control fluid into the piston housings,
wherein the first fluid channel has at least one first fluid channel inlet for receiving the first control fluid and having a plurality of first fluid channel outlets for delivering the first control fluid to the piston housings, and the second fluid channel having at least one second fluid channel inlet for receiving the second control fluid and a plurality of second fluid channel outlets for delivering the second control fluid to the piston housings.

2. An injection molding machine as set forth in claim 1, wherein the adapter plate has an upper surface, a lower surface and a peripherally extending edge surface connecting the upper surface to the lower surface, and wherein the plurality of the first fluid passage outlets and the plurality of the second fluid passage outlets are arranged on the lower surface.

3. An injection molding machine as set forth in claim 1, wherein the cross-section of the first fluid passage inlet differs from the cross-sections of the first fluid passage outlets.

4. An injection molding machine as set forth in claim 1, wherein the adaptor plate comprises at least two plate-shaped elements which are arranged in mutually superposed relationship and comprise differing material, wherein the material from which the one plate-shaped element is made has a lower degree of thermal conductivity than the material from which the other plate-shaped element is made.

5. An injection molding machine as set forth in claim 1, wherein the adaptor plate comprises at least two adaptor plate segments, wherein each of the at least two adaptor plate segments has at least one fluid passage outlet and at least one fluid passage extends over the at least two adaptor plate segments.

6. An injection molding machine as set forth in claim 1, wherein the adaptor plate has a through opening for receiving a sprue passage of an injection molding machine.

7. An injection molding machine as set forth in claim 1, wherein there is provided a third fluid passage for carrying a temperature-control fluid.

8. An injection molding machine as set forth in claim 1, wherein the adaptor plate is fixed to the hot runner distributor plate.

9. An injection molding machine as set forth in claim 1, wherein the adaptor plate is connected in positively locking relationship to the cover plate in all directions perpendicularly to axes of the closure needles but a relative movement is possible in the direction of the closure needle axes.

10. An injection molding machine as set forth in claim 8, wherein each closure needle is guided by one of the piston housings through the hot runner distributor plate into a nozzle housing which has an opening closable by the closure needle, and wherein a spring element is arranged between the nozzle housing and the cover plate.

11. An injection molding machine as set forth in claim 8, wherein a spring element is arranged between cover plate and adaptor element or between the piston housing and the hotrunner distribution plate.

12. An injection molding machine as set forth in claim 1, wherein the piston housing and/or the adaptor plate has/have a first circular groove in which a first O-ring is arranged,
wherein the first O-ring seals off the first fluid inlet of the piston housing with respect to the second fluid inlet of the piston housing,
wherein the piston housing and/or the adaptor plate has/have a second circular groove in which a second O-ring is arranged, and
wherein the first fluid inlet of the piston housing is arranged between the first and second O-rings.

13. An injection molding machine as set forth in claim 2, wherein the first fluid passage inlet and the second fluid passage inlet are arranged on the upper surface.

14. An injection molding machine as set forth in claim 3, wherein the cross-section of the second fluid passage inlet differs from the cross-sections of the second fluid passage outlets.

15. An injection molding machine as set forth in claim 4, wherein the fluid passage outlets are arranged in the plate-shaped element made from the material with the higher level of thermal conductivity.

16. An injection molding machine as set forth in claim 2, wherein the cross-section of the first fluid passage inlet differs from the cross-sections of the first fluid passage outlets,
wherein the adaptor plate comprises at least two plate-shaped elements which are arranged in mutually superposed relationship and comprise differing material,
wherein the material from which the one plate-shaped element is made has a lower degree of thermal conductivity than the material from which the other plate-shaped element is made, and
wherein the fluid passage outlets are arranged in the plate-shaped element made from the material with the higher level of thermal conductivity.

* * * * *